3,813,404
TROPANE-2-CARBOXYLATES AND DERIVATIVES
Robert L. Clarke, Bethlehem, and Sol J. Daum, Albany,
N.Y., assignors to Sterling Drug Inc., New York, N.Y.
No Drawing. Filed Nov. 15, 1972, Ser. No. 306,918
Int. Cl. C07d 43/06
U.S. Cl. 260—292                     9 Claims

ABSTRACT OF THE DISCLOSURE

Tropane derivatives having a phenyl or substituted phenyl group in the 3-position and a carbo-lower-alkoxy group in the 2-position, possessing local anesthetic and/or stimulant activity, are prepared by reacting an anhydroecgonine lower-alkyl ester with an arylmagnesium halide.

---

This invention relates to novel tropane derivatives, and in particular is concerned with tropanes having a phenyl or substituted phenyl group in the 3-position and a carbo-lower-alkoxy group in the 2-position.

The compounds of the invention have the formula

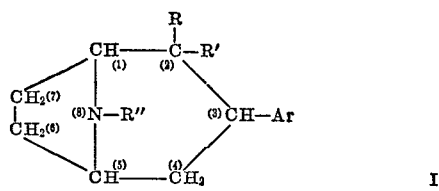

I wherein:

one of R and R' is hydrogen and the other of R and R' is carbo-lower-alkoxy;

R" is hydrogen or lower-alkyl;

Ar is phenyl or phenyl substituted by from one to two substituents selected from the group consisting of lower-alkyl, lower-alkoxy, fluoro, chloro, and hydroxy.

Also included within the scope of the invention are acid-addition salts of the compounds of the above formula.

In the foregoing definitions of R, R', R" and Ar, the terms lower-alkyl and lower-alkoxy refer to such groups which are straight or branched and have from one to six carbon atoms.

Any stereochemical arrangement of the nucleus and substituent groups is contemplated, although the configuration of the natural belladonna type alkaloids, atropine, cocaine, etc., i.e. 1αH,5αH-tropane, with the 3-substituent in the β-position (equatorial) is preferred. The latter structure can be represented as follows:

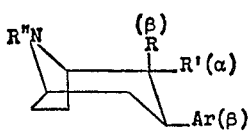

The compounds of the invention, if derived by synthesis from natural sources will be optically active. However, optically inactive racemic mixtures can be obtained by total synthesis and these in turn can be resolved by conventional procedures to obtain both optical isomers, one being identical to the enantiomer obtained from natural sources and the other the "unnatural" enantiomer.

The compounds of formula I where R" is lower-alkyl, R and R' have the meanings given above, and Ar is phenyl or phenyl substituted by from one to two substituents selected from the group consisting of lower-alkyl, lower-alkoxy, fluoro, or chloro can be prepared by reacting a compound of the formula

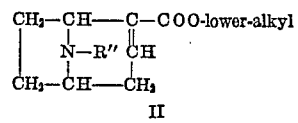

II wherein R" is lower-alkyl with Ar-magnesium halide. There is thus produced a mixture of isomers of formula I, the isomerism involving the orientation of the groups in the 2-position. The isomers can be separated by chromatographic procedures, or, alternatively, by a quarternization procedure using a lower-alkyl or benzyl halide, whereby the 2α-carboxylate (equatorial) isomer is selectively quaternized forming a water-soluble salt, readily removed by partitioning the mixture between water and an organic solvent. The unquaternized 2β-carboxylate (axial) isomer remains in the organic silvent and can be isolated therefrom. The loweralkyl halide quaternizing agent can have from one to four carbon atoms, and the halide can be chloride, bromide or iodide.

In the reaction of a compound of formula II with a Grignard reagent, a small quantity of byproduct of formula III:

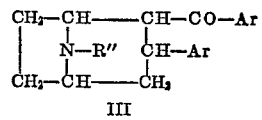

III is formed, resulting from the reaction of a second molecule of Grignard reagent with the carbo-lower-alkoxy group. The byproducts of formula III are readily separated from the compounds of formula I by fractional distillation, the former being the less volatile.

The compounds of formula I wherein Ar is hydroxyphenyl are prepared by acid cleavage of the compounds of formula I wherein Ar is lower-alkoxyphenyl. Some concurrent hydrolysis of the 2-carbo-lower-alkoxy group to a 2-carboxy group may occur, necessitating re-esterification of the product.

The compounds of formula I wherein R" is hydrogen are prepared from the compounds of formula I wherein R" is methyl by a demethylation procedure involving treatment with 2-chloroethyl chloroformate, followed by reacting the resulting N-(2-chloroethoxycarbonyl) compound with chromous perchlorate.

Pharmacological evaluation of the compounds of formula I has shown that they possess local anesthetic activity when tested by the standard intradermal anesthetic test in guinea pigs [Bülbring and Wajda, J. Pharmacol. Exptl. Therap., 85, 78 (1945)]. The compounds have an activity of the order of 10–20 percent that of cocaine. Furthermore, the compounds of formula I, where the carbo-lower-alkoxy group in the 2-position has the β-configuration (axial) and the enantiomorphic form is that derived from natural sources, have been shown to possess stimulant properties when tested by the effect on locomotor activity in mice according to the method of Aceto et al., J. Pharmacol. Exptl. Therap. 158, 286 (1967); and by the prevention and reversal of reserpine-induced eyelid ptosis in mice according to the method of Aceto and Harris, Toxicol. Appl. Pharmacol, 7, 329 (1965). For example, the compound of formula I where R is β-carbomethoxy, R' is hydrogen, R" is methyl and Ar is phenyl is sixteen times as active as cocaine as a stimulant in the locomotor activity test; and the compound where R is β-carbomethoxy, R' is hydrogen, R" is methyl and Ar is p-fluorophenyl is sixty-four times as active as cocaine in the locomotor activity test, and five and twenty times as active as cocaine in the reserpine-induced ptosis prevention and reversal tests, respectively.

The compounds of formula I are useful both in the free base form and in the form of acid-addition salts, and both forms are within the purview of the invention. The acid-addition salts are simply a more convenient form for use, and in practice, use of the salt form inherently amounts to use of the base form. For pharmaceutical purposes, the acids which can be used to prepare the acid-addition salts include preferably those which produce, when combined with the free base, medicinally acceptable salts, that is, salts whose anions are relatively innocuous to the animal organism in medicinal doses of the salts, so that the beneficial properties inherent in the free base are not vitiated by side effects ascribable to the anions. Appropriate medicinally acceptable salts within the scope of the invention are those derived from mineral acids such as hydrochloric acid, hydrobromic acid, hydriodic acid, nitric acid, phosphoric acid, sulfamic acid, and sulfuric acid; and organic acids such as acetic acid, citric acid, tartaric acid, lactic acid, cyclohexanesulfamic acid, methanesulfonic acid, ethanesulfonic acid, benzenesulfonic acid, p-toluenesulfonic acid, quinic acid, and the like, giving the hydrochloride, hydrobromide, hydriodide, nitrate, phosphate, sulfamate, acetate, citrate, tartrate lactate, cyclohexanesulfamate methanesulfonate, ethanesulfonate, benzenesulfonate, p-toluenesulfonate and quinate, respectively.

The acid-addition salts of said basic compounds are prepared either by dissolving the free base in aqueous or aqueous-alcohol solution containing the appropriate acid and isolating the salt by evaporating the solution, or by reacting the free base and acid in an organic solvent, in which case the salt separates directly or can be obtained by concentration of the solution.

Although medicinally acceptable salts of said basic compounds are preferred for pharmaceutical purposes, all acid-addition salts are within the scope of our invention. All acid-addition salts are useful as sources of the free base form even if the particular salt *per se* is desired only as an intermediate product as for example when the salt is formed only for purposes of purification or identification, or when it is used as an intermediate in preparing a medicinally acceptable salt by ion exchange procedures.

The compounds can be prepared for use by dissolving under sterile conditions salt forms of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like.

The molecular structures of the compounds of this invention were assigned on the basis of the methods of their synthesis and the study of their infrared and nuclear magnetic resonance (NMR) spectra, and confirmed by the correspondence between calculated and found values for the elementary analyses for representative examples.

The best mode of carrying out the preparative aspect of the invention is as follows:

To an efficiently stirred solution of 1.0 mole of Grignard reagent (Ar-Mg halide) in 1.0 liter of ether maintained at −20° (±3°) C. under nitrogen was added a solution of 0.5 mole of anhydroecgonine lower-alkyl ester (formula II, R″ is methyl) in 300 ml. of ether. Stirring was continued at this temperature for one hour and the mixture then poured onto 500 g. of ice. The resulting mixture was acidified with 2 N hydrochloric acid to dissolve all solid material and the ether layer was then separated and discarded. The water layer was made basic with concentrated ammonium hydroxide and saturated with sodium chloride, and then extracted three times with ether. The resulting product was distilled at 0.4 mm. A minor amount of unchanged anhydroecgonine ester distilled first, followed by a mixture of the 2α- and 2β-carbo-lower-alkoxy isomers of formula I. The 2-aroyl-3-aryltropane byproducts of formula III remained behind in the still pot.

If isolation of both the 2α- and 2β-epimers was desired, the mixture of isomers was chromatographed on silica gel (40 g. per g. of compound) using isopropylamine-ether-pentane (3:30:67) for elution. The 2β-epimer was eluted first. If only the 2β-epimer was wanted, the mixture was heated under reflux for five hours with four volumes of acetone and 1.1 equivalent of ethyl iodide. The acetone and excess ethyl iodide were removed *in vacuo* and the residue partitioned between ether and water to give the pure β-epimer in the ether layer and the quaternary ammonium salt of the α-epimer in the water layer.

The still pot residue was chromatographed on silica gel to afford the 2β-aroyl-3-aryltropane as a quickly eluted material and the 2α-aroyl isomer as the more polar component.

The following examples, prepared according to the foregoing procedure will further illustrate the invention without the latter being limited thereby.

EXAMPLE 1

Methyl 3β-phenyl-1αH,5αH-tropane-2-carboxylate was prepared from (−)-anhydroecgonine methyl ester ("natural" isomer) and phenylmagnesium bromide. The mixture of isomers was obtained in 75% yield and separated by chromatography into (−)-methyl 3β - phenyl-1αH, 5αH - tropane-2β-carboxylate, M.P. 63–64.5° C. (plates from pentane), $[\alpha]_D^{25} = -5.3°$ (1% in chloroform) (16% yield), 1,5-naphthalenedisulfonate salt, M.P. 272–274° C. (dec.), $[\alpha]_D^{25} = -86.4°$ (1% in water); and (+)-methyl 3β - phenyl-1αH,5αH-tropane-2α-carboxylate, M.P. 70–72° C. (prisms from pentane), $[\alpha]_D^{25} = +4.6°$ (2% in chloroform) (46% yield), hydrochloride salt, M.P. 197–198° C. (needles from acetone), $$[\alpha]_D^{25} = +31.4°$$

(1% in water).

From the residue from distillation of the crude reaction mixture was isolated 2β - benzoyl - 3β-phenyl-1αH,5αH-tropane, M.P. 179–180° C. (from ether), $[\alpha]_D^{25} = +44.1°$ (1% in chloroform) and 2α-benzoyl-3β-phenyl-1αH,5αH-tropane, M.P. 129–130° C. (from ethanol), $$[\alpha]_D^{25} = -57.9°$$

(1% in chloroform).

EXAMPLE 2

Methyl 3β - (p-fluorophenyl)-1αH,5αH-tropane-2-carboxylate was prepared from (−)-anhydroecgonine methyl ester and p-fluorophenylmagnesium bromide. Cuprous chloride (7 mole percent) was used in this reaction which was run at −10° C. The mixture of isomers was separated on a small scale by thick layer chromatography on silica gel, and on a large scale by the selective quaternization process to afford (−)-methyl 3β(p-fluorophenyl)-1αH, 5αH - tropane - 2β-carboxylate, M.P. 93–94.5° C. (from pentane), 1,5-naphthalenedisulfonate salt, M.P. 288–290° C. (dec.) (from acetonitrile), $[\alpha]_D^{25} = -83.9°$ (1% in water); and (+)-methyl 3β-(p-fluorophenyl)-1αH,5αH-tropane - 2α-carboxylate, M.P. 70.5–73° C. (from pentane), $[\alpha]_D^{25} = +1.1°$ (5% in chloroform), hydrochloride salt monohydrate, M.P. 85–92° C. (needles from ethyl acetate-ether-water mixture), $[\alpha]_D^{25} = +23.7°$ (1% in water).

(−)-Methyl 3β-(p-fluorophenyl)-1αH,5αH-tropane-2β-carboxylate was hydrolyzed to the free acid by heating at reflux a solution of 1.23 g. of the ester in 60 ml. of 2 N hydrochloric acid for 24 hours and concentrating the mixture to give a crystalline residue. The residue was recrystallized from acetone to give 0.83 g. of 3β-(p-fluorophenyl)-1αH,5αH-tropane-2β-carboxylic acid in the form of its hydrochloride salt, M.P. 272–274° C., $$[\alpha]_D^{25} = -105.3°$$

(1% in water).

EXAMPLE 3

Methyl 3β - (p-methoxyphenyl) - 1αH,5αH-tropane-2-carboxylate was prepared from (—)-anhydroecgonine methyl ester and p-methoxy-phenylmagnesium bromide. The unsaturated ester was added at 0° C. and the reaction was allowed to warm to 25° C. during the stirring period. The mixture of epimers was distilled and then separated on silica plates, to afford methyl 3β-(p-methoxyphenyl)-1αH,5αH-tropane-2β-carboxylate, 1.5-naphthalenedisulfonate salt, M.P. 288° C. (dec.) (heavy needles from acetonitrile), $[\alpha]_D^{25}$=—92.0° (1% in water; and methyl 3β-(p-methoxyphenyl) - 1αH,5αH-tropane-2α-carboxylate, M.P. 74.5–75.5° C. (blades and needles from pentane), $[\alpha]_D^{25}$=+9.3° (1% in chloroform).

From the residue from distillation of the crude reaction mixture was isolated 2α - (p-methoxybenzoyl) - 3β-(p-methoxyphenyl) - 1αH,5αH-tropane, M.P. 123–124° C. (pale yellow prisms from ether), $[\alpha]_D^{25}$=—82.7° (1% in chloroform).

EXAMPLE 4

Isopropyl 3β - phenyl-1αH,5αH-tropane-2β-carboxylate was prepared from (—)-anhydroecgonine isopropyl ester and phenylmagnesium bromide in the presence of 5 mole percent of cupric iodide at —10° C. The crude, undistilled mixture was chromatographed directly on a silica gel column to give a 20% yield of isopropyl 3β - phenyl-1αH, 5αH-tropane-2β-carboxylate, M.P. 244–245° C. (dec.), fine needles from methanol-ether, $[\alpha]_D^{25}$=—105.4° (1% in water).

The starting material, (—)-anhydroecgonine isopropyl ester was prepared as follows: A mixture of 50 g. of natural ecgonine hydrochloride and 100 ml. of phosphorus oxychloride was heated at reflux for one hour and the excess phosphorus oxychloride was removed by warming the mixture in vacuo. The residue was treated with 350 ml. of isopropyl alcohol and allowed to stand for three days. The solvent was removed, the residue made basic with 35% sodium hydroxide, and the mixture extracted with ether. The oil thus extracted was distilled to give 42 g. of (—)-anhydroecgonine isopropyl ester, B.P. 87–96° C. (0.8 mm.), $[\alpha]_D^{25}$=—33.1° (1% in chloroform), $n_D^{25}$ 1.4860.

EXAMPLE 5

Isopropyl 3β - (p-fluorophenyl) - 1αH,5αH-tropane-2-carboxylate was prepared from (—)-anhydroecgonine isopropyl ester and p-fluorophenylmagnesium bromide. The isomer mixture was separated by the selective quaternization process to afford isoproyl 3β-(p-fluorophenyl)-1αH, 5αH - tropane-2β-carboxylate, M.P. 110–112° C. (from pentane), hydrochloride salt, M.P. 224° C. (dec.) (from acetone), $[\alpha]_D^{25}$=—97.3° (1% in water).

EXAMPLE 6

(a) Methyl 8 - (2 - chloroethoxycarbonyl)-3β-phenyl-1αH,5αH-nortropane-2β-carboxylate.—A mixture of 5.40 g. (0.00208 mole) of (—)-methyl 3β-phenyl-1αH,5αH-tropane-2β-carboxylate (Example 1) and 4.3 ml. (5.9 g., 0.00416 mole) of 2-chloroethyl chloroformate was heated at 100° C. for 75 minutes. The excess chloroformate was then removed by warming the mixture in vacuo, and the residual oil was dissolved in ether and percolated through 200 g. of silica gel. The first 400 ml. of eluate contained 4.8 g. of methyl 8-(2-chloroethoxycarbonyl)-3β-phenyl-1αH,5αH-nortropane-2β-carboxylate as an oil which was used without further purification in the next reaction.

(b) Methyl 3β - phenyl - 1αH,5αH-nortropane-2β-carboxylate.—To a stirred solution of 10 ml. of ethylenediamine in 800 ml. of dimethylformamide in an oxygen-free atmosphere (argon) was added 100 ml. of 0.83 N chromous perchlorate. The mixture, the temperature of which rose to 42° C., was cooled to 25° C., and 4.80 g. (0.00136 mole) of methyl 8-(2-chloroethoxycarbonyl)-3β-phenyl-1αH,5αH-nortropane-2β-carboxylate in 20 ml. of dimethylformamide was added. This mixture was stirred for 2 hours, allowed to stand for about sixteen hours and then poured into ice-water. Ammonium carbonate (10 g.) was added and the weakly basic mixture was extracted three times with chloroform-ethanol (2:1). The extracts were treated with an excess of 2 N hydrochloric acid and concentrated in vacuo. The pasty residue was treated with excess cold 2 N sodium hydroxide and the product extracted with ether. The oil obtained from the extracts was chromatographed on silica chromatoplates to give 2.05 g. of methyl 3β - phenyl - 1αH,5αH-nortropane-2β-carboxylate, which was converted to its hydrochloride salt monohydrate, M.P. 118–122° C. (dec.), $[\alpha]_D^{25}$=—110.0° (1% in water).

EXAMPLE 7

(a) (+)-Methyl 3α - hydroxy - 1αH,5αH-tropane-2α-carboxylate [(+)-pseudoalloecgonine methyl ester].—A solution of 7.00 g. (0.0183 mole) of methyl 3-oxo-1αH, 5αH-tropane - 2α - carboxylate levo-bitartrate dihydrate [Findlay, J. Org. Chem., 22, 1385 (1957)] in 100 ml. of water was diluted with 200 ml. of acetic acid, 1.0 g. of platinum oxide catalyst was added, and the mixture was hydrogenated at room temperature under a pressure of 4.2 kg./cm.² for 19 hours. The catalyst and solvent were removed and the residual oil was treated with chloroform and an excess of cold 35% sodium hydroxide. The aqueous layer was extracted twice with chloroform, and the combined chloroform layers were concentrated to give an oil. This oil was dissolved in 100 ml. of ether, the solution filtered and the solvent evaporated to give an oil which solidified (3.05 g.). The latter was recrystallized twice from hexane, while removing a small amount of insoluble brown powder, to give (+)-pseudoalloecgonine methyl ester, M.P. 82.5–84.5° C., $[\alpha]_D^{25}$=+38.2° (1% in chloroform).

(b) (+)-Anhydroecgonine methyl ester.—A mixture of 15.7 g. (0.079 mole) of (+)-pseudoalloecgonine methyl ester and 50 ml. of phosphorus oxychloride was refluxed for 2.5 hours and then concentrated to a residual oil by warming the mixture in vacuo. The oil was poured onto ice and the mixture made basic with 35% sodium hydroxide solution. The product was extracted with two portions of ether and four portions of chloroform and distilled, giving 8.72 g. (61%) of (+)-anhydroecgonine methyl ester (the "unnatural" isomer), B.P. 67–74° C. (0.1 mm.). A center cut showed $n_D^{26}$=1.5011, $[\alpha]_D^{25}$ =+38.3° (1% in chloroform).

(c) (+)-Methyl 3β-phenyl - 1αH,5αH - tropane-2β-carboxylate was prepared by reacting (+)-anhydroecgonine methyl ester and phenylmagnesium bromide, and was obtained in the form of its 1,5-naphthalenedisulfonate salt, colorless needles, M.P. 272–274° C. (dec.), $[\alpha]_D^{25}$ =+85.2° (1% in water), the optical isomer (mirror image) of the 1,5-naphthalenedisulfonate salt obtained in Example 1.

EXAMPLE 8

Methyl 3β-(p-fluorophenyl)-1αH,5αH-tropane - 2 - carboxylate was prepared from (+)-anhydroecgonine methyl ester and p-fluorophenylmagnesium bromide using 6 mole percent of cuprous chloride. The temperature was held at 0 to —5° C. during ester addition and subsequent stirring. The epimers were separated on silica gel using isopropylamine-ether-pentane (0.5:69.5:30) for elution. There was thus obtained a 9.5% yield of (+)-methyl-3β-(p-fluorophenyl)-1αH,5αH-tropane-2β-carboxylate, M.P. 94–96° C. (needles from pentane), 1,5 - naphthalenedisulfonate salt, M.P. 292–294° C. (dec.) (needles from acetonitrile), $[\alpha]_D^{25}$=+84.5° (1% in water); and (—)-methyl-3β(p-fluorophenyl)-1αH,5αH-tropane - 2α - carboxylate, M.P. 71.5–73.5° C. (needles from pentane), $[\alpha]_D^{25}$=—1.2° (5% in chloroform). These are the optical isomers (mirror images) of the compounds obtained in Example 2.

EXAMPLE 9

Methyl 3β - (m-methoxyphenyl)-1αH,5αH-tropane-2-carboxylate was prepared from (—)-anhydroecgonine methyl ester and m-methoxyphenylmagnesium bromide in 50% yield. The product was a 3:1 mixture of the 2α- and 2β-carboxylates and boiled at 159–164° C. (0.4 mm.). It was separated by chromatography or by selective quaternization with benzyl chloride in boiling acetonitrile. The quaternized 2α-carboxylate was then debenzylated catalytically to regenerate the tertiary base. Thus obtained were methyl 3β-(m-methoxyphenyl)-1αH,5αH-tropane-2α-carboxylate, M.P. 81–82° C. (needles from hexane), $[\alpha]_D^{25} = +4.5°$ (1% in chloroform) and methyl 3β-(m-methoxyphenyl)-1αH,5αH-tropane - 2β - carboxylate, an oily base.

EXAMPLE 10

Methyl 3β - (m-hydroxyphenyl)-1αH,5αH-tropane-2β-carboxylate.—A solution of 4.0 g. of methyl 3β-(m-methoxyphenyl)-1αH,5αH-tropane-2β-carboxylate in 20 ml. of 48% aqueous hydrogen bromide was heated under reflux for 45 minutes. The product was collected by filtration to give 3β-(m-hydroxyphenyl)-1αH,5αH-tropane-2β-carboxylic acid hydrobromide as colorless needles. The product was suspended in 60 ml. of methanol and the mixture saturated with gaseous hydrogen chloride. It was then refluxed for six hours in the presence of a slow stream of hydrogen chloride. The solution was concentrated to a residue which was made basic with ammonium hydroxide and extracted with ether. Evaporation of the ether afforded methyl 3β-(m-hydroxyphenyl)-1αH,5αH-tropane-2β-carboxylate which was converted to its hydrochloride salt, 1.01 g., colorless needles, M.P. 311° C. (dec.), $[\alpha]_D^{25} = -111.3°$ (1% in water).

EXAMPLE 11

Methyl 8 - isopropyl-3β-phenyl-1αH,5αH-nortropane-2-carboxylate can be prepared from 8-isopropylanhydronorecgonine methyl ester (prepared by reacting anhydronorecgonine methyl ester with isopropyl bromide in the presence of potassium acetate in dimethylformamide solution) and phenylmagnesium bromide according to the standard procedure described above.

Similarly, methyl 8-(n-hexyl)-3β-phenyl-1αH,5αH-nortropane-2-carboxylate can be prepared from 8-(n-hexyl)anhydroecgonine methyl ester and phenylmagnesium bromide.

EXAMPLE 12

Methyl 3β - (p-chlorophenyl)-1αH,5αH-tropane-2-carboxylate can be prepared from anhydroecgonine methyl ester and p-chlorophenylmagnesium bromide according to the standard procedure described above.

EXAMPLE 13

Methyl 3β - (3,4-dimethoxyphenyl)-1αH,5αH-tropane-2-carboxylate can be prepared from anhydroecgonine methyl ester and 3,4-dimethoxyphenylmagnesium bromide according to the standard procedure described above.

EXAMPLE 14

Methyl 3β - (3 - methoxy-4-chlorophenyl)-1αH,5αH-tropane-2-carboxylate can be prepared from anhydroecgonine methyl ester and 3-methoxy-4-chlorophenylmagnesium bromide according to the standard procedure described above.

We claim:
1. A compound selected from the group consisting of (A) a compound of the formula

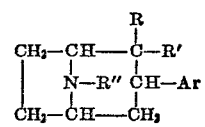

wherein:
one of R and R' is hydrogen and the other of R and R' is carbo-lower-alkoxy;
R" is hydrogen or lower-alkyl;
Ar is phenyl or phenyl substituted by from one to two substituents selected from the group consisting of lower-alkyl, lower-alkoxy, fluoro, chloro and hydroxy; and (B) a pharmaceutically acceptable acid-addition salt of a compound under (A) above.

2. A compound according to claim 1 wherein R" is methyl.

3. Lower-alkyl 3-β-phenyl-1αH,5αH-tropane-2-carboxylate, according to claim 2.

4. Methyl 3β-phenyl-1αH,5αH-tropane-2β-carboxylate, according to claim 3.

5. Lower alkyl 3β-(4-fluorophenyl)-1αH,5αH-tropane-2-carboxylate, according to claim 2.

6. Methyl 3β - (4-fluorophenyl)-1αH,5αH-tropane-2β-carboxylate, according to claim 5.

7. Lower-alkyl 3β - (methoxyphenyl)-1αH,5αH-tropane-2-carboxylate, according to claim 2.

8. Lower-alkyl 3β - phenyl-1αH,5αH-nortropane-2-carboxylate, according to claim 1.

9. The process for separating the 2α- and 2β-epimers from the epimer mixture of lower-alkyl 3β-Ar-1αH,5αH-tropane-2-carboxylate, wherein Ar has the meaning given in claim 1, which comprises heating said mixture with a lower-alkyl or benzyl halide in an inert solvent, and partitioning the product between water and an organic solvent, thereby removing the 2α-epimer in the form of its water-soluble quaternary ammonium salt.

References Cited
UNITED STATES PATENTS 3,058,984   10/1962   Archer et al. _____ 260—292
3,056,794   10/1962   Archer et al. _____ 260—292

ALAN L. ROTMAN, Primary Examiner

U.S. Cl. X.R.

424—267